Patented Apr. 4, 1950

2,502,472

UNITED STATES PATENT OFFICE 2,502,472

ELECTROLYTIC PREPARATION OF CALCIUM D-ARABONATE

Charles L. Mehltretter and William Dvonch, Peoria, Ill., assignors to the United States of America as represented by the Secretary of Agriculture No Drawing. Application August 9, 1946, Serial No. 689,347

7 Claims. (Cl. 204—79)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to the preparation of calcium D-arabonate by electrolytic oxidation of solutions containing 2-keto-D-gluconate. It particularly relates to the preparation thereof by electrolytically oxidizing an aqueous solution of calcium 2-keto-D-gluconate containing a bromide, such as calcium bromide. It further relates to oxidation of liquors containing calcium 2-keto-D-gluconate, for example, fermentation liquors containing the latter.

We have discovered that a yield of calcium D-arabonate as high as 85 percent can be obtained by the oxidation of an aqueous solution of calcium 2-keto-D-gluconate by bromine generated in solution by electrolysis of bromide. Good results have also been achieved by the direct bromine oxidation of calcium 2-keto-D-gluconate in nearly neutral solution in the presence of carbonate buffers. However, the advantage of the electrolytic process is that considerably less than one equivalent of calcium bromide can be used for the oxidation of one equivalent of calcium 2-keto-D-gluconate. Also, the calcium bromide is unchanged in the final mother liquor and can be used for a second oxidation. The electrolysis occurs in slightly acid solution and is represented by the over-all equation:

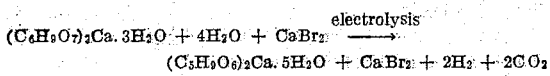

$$(C_6H_9O_7)_2Ca \cdot 3H_2O + 4H_2O + CaBr_2 \xrightarrow{\text{electrolysis}}$$
$$(C_5H_9O_6)_2Ca \cdot 5H_2O + CaBr_2 + 2H_2 + 2CO_2$$

This reaction scheme is a simplified version of the actual reaction. About half of the arabonic acid formed is found as the calcium salt at the end of the electrolysis, but the remainder appears as the soluble D-arabonolactone, which is formed along with an equivalent amount of calcium carbonate which precipitates out. The arabonolactone is neutralized by heating with calcium carbonate. In the practice of this invention favorable results are obtained when graphite electrodes are used and the solution is mechanically stirred.

During the course of the reaction, the reducing value of the mixture is repeatedly determined with Fehling's solution, and the electrolysis discontinued when minimum reduction is reached. Because of the absence of objectionable byproducts the calcium D-arabonate formed can be crystallized directly from the oxidation mixture as practically pure calcium D-arabonate pentahydrate. The final mother liquor which contains the halide may be used for a second oxidation by simply adding more calcium 2-keto-D-gluconate and repeating the process. Fermentation liquors containing a high percentage of calcium 2-keto-D-gluconate, such as that of Lockwood et al., U. S. Patent No. 2,277,716, were also oxidized by this process and gave good yields of calcium D-arabonate. In fact, it has been found to be more practical to electrolyze such liquors directly. It has also been found that electrolysis at a temperature of 5° to 10° C. is conducive to higher yields of product, although satisfactory results are obtained at 25° to 30° C. The following examples illustrate the nature of our invention:

Example 1

60.0 grams (about ⅕ mole) of calcium 2-keto-D-gluconate trihydrate and 8.0 grams of calcium bromide are dissolved in 1 liter of water in a 1500 ml. beaker containing two 3" x 7½" x $\tfrac{5}{16}$" graphite electrodes placed two inches apart. The solution which has a pH of 6.4 is stirred mechanically and 1 ampere of direct current passed through for approximately 16.5 hours (theory is 13.4 ampere-hours) while maintaining the temperature of the reaction at 5° to 10° C. and periodically reversing the polarity of the electrodes to remove the cathodic deposit that forms. At the end of this time, the solution has practically no reducing value and indicates substantially complete reaction of the calcium 2-keto-D-gluconate. The oxidized solution, containing calcium D-arabonate and D-arabonolactone, is heated with an excess of calcium carbonate for two hours at 90° to 100° C. to convert D-arabonolactone present to calcium D-arabonate and is filtered from excess calcium carbonate. Upon concentrating the clear filtrate in vacuo, practically pure calcium D-arabonate pentahydrate crystallizes out and is collected on a filter and washed with 95 per cent ethanol. The air-dried product weights 43.1 grams which is a yield of 75 percent of theory. It has a specific rotation at 25° C. of —3.5° (C, 1.00; H₂O) and contains 8.73 percent calcium. Pure calcium D-arabonate has $[\alpha]_D^{25°} = -3.0°$ (C, 1.00; H₂O) and its calcium content is 8.71 percent.

The mother liquor which contains 5.8 grams of dissolved calcium D-arabonate and all of the calcium bromide may be treated with more calcium 2-keto-D-gluconate and the electrolysis repeated. In the above experiment the weight of product isolated plus that in solution represents a yield of 85 percent of theory.

Example 2

60.0 grams of calcium 2-keto-D-gluconate trihydrate and 8.0 grams of calcium bromide are dissolved in one liter of water in a 1500 ml. beaker containing graphite electrodes. The solution is stirred mechanically and one ampere of direct current passed through for 13.4 ampere-hours at a reaction temperature of 25° to 30° C. The electrolysis liquor is heated at 90° to 100° for two hours with excess calcium carbonate and unreacted calcium carbonate removed by filtration. The clear filtrate is concentrated in vacuo to a syrup which, on reaction with excess hydrated lime, precipitates basic calcium D-arabonate. The filtered basic salt is suspended in water with agitation and neutralized to phenolphthalein by the addition of carbon dioxide. After filtering off the precipitated calcium carbonate, the clear filtrate is concentrated in vacuo to crystallize calcium D-arabonate pentahydrate. The filtered, washed, and air-dried product is obtained in a yield of 55 percent of theory. At least 10 percent more is dissolved in the mother liquor so that the total amount of product formed is 65 percent of that required by theory.

Example 3

Dextrose is fermented to 2-keto-D-gluconic acid with *Pseudomonas fluorescens* in the presence of calcium carbonate. An analysis of the decolorized and filtered fermentation liquor indicates that 96 percent of the dextrose has been converted to calcium 2-keto-D-gluconate. 406 ml. of clear liquor, containing 60.2 grams of calcium 2-keto-D-gluconate trihydrate, is diluted to one liter with distilled water and 8.0 grams of calcium bromide added. This solution is electrolytically oxidized at 5° to 10° C. between graphite electrodes with the aid of mechanical stirring. Electrolysis is continued for 17.5 ampere-hours when the reducing value of the solution becomes negligible and the pH is 6.3. The oxidized solution is heated on the steam bath for two hours with an excess of calcium carbonate and then decolorized and filtered. On concentrating the filtrate in vacuo crystallization of calcium D-arabonate pentahydrate occurs. The product is collected by filtration, washed with 95 percent ethanol, and air dried. The weight of calcium D-arabonate pentahydrate obtained is 33.4 grams which is a yield of 58 percent of that required by theory. The specific rotation of the product at 25° C. is —2.9° (C, 1.00; $H_2O$).

Example 4

One-half of the final mother liquor of Example 3, which contains approximately four grams of calcium bromide, is mixed with 203 ml. of fermentation liquor containing 30.1 grams of calcium 2-keto-D-gluconate trihydrate (about $\frac{1}{16}$ mole) and diluted to 500 ml. with distilled water. Electrolysis of this solution is carried out as illustrated in Example 3 for 8.9 ampere-hours when a minimum of reduction of Fehling's reagent occurs and the solution reaches a pH of 6.3. The oxidation mixture is heated with excess calcium carbonate for two hours at 90° to 100° C. and filtered. The clear colorless filtrate is concentrated in vacuo to crystallization and nearly pure calcium D-arabonate pentahydrate is isolated in a yield of 73 percent of that required by theory. The product has a specific rotation at 25° C. of —3.1° (C, 1.00; $H_2O$) and contains 8.74 percent calcium.

The pH of the solution of calcium 2-keto-D-gluconate and calcium bromide used in Examples 1 and 2 was determined each time before electrolysis and was found to be within the pH range 6.4 to 6.2. These values do not depart much from the pH of 5.4 that distilled water has in equilibrium with the carbon dioxide of the atmosphere. These values are in the range from about 6 to, but less than, 7.

Our process is carried out under weakly acid conditions. Electrolysis of free 2 - keto - D - gluconic acid did not yield arabonic acid.

Isbell, in United States Patent 1,976,731, October 16, 1934, indicates that an aqueous solution of D-glucose can be oxidized electrolytically to calcium D-gluconate in nearly quantitative yield in the presence of bromide and calcium carbonate. By prolonging the electrolysis to twice the period required for conversion of D-glucose to calcium D-gluconate, Cook and Major (J. Am. Chem. Soc. 57, 773 (1935)) have isolated calcium 5-keto-D-gluconate in a yield of 9 percent. No other products of oxidation were reported. We have extended the time of electrolysis of an aqueous solution of calcium D-gluconate containing calcium bromide considerably beyond that reported by Cook and Major and have obtained, besides calcium 5-keto-D-gluconate, the calcium salts of oxalic and D-arabonic acid.

A more detailed description of the electrolysis of calcium D-gluconate to calcium D-arabonate is given below.

A liter of an aqueous solution containing 28.1 grams of calcium gluconate monohydrate and 9.4 grams of calcium bromide dihydrate was electrolyzed between graphite electrodes. The solution was stirred mechanically and 0.5 ampere of current passed through for 26.8 hours at 7.5 volts. It was then filtered from a small amount of calcium oxalate and concentrated in vacuo to 50 ml. After standing at room temperature for several days 1.5 grams of calcium 5-keto-D-gluconate crystallized out and was removed by filtration. The filtrate was poured into 500 ml. of ethanol and the sirupy mass of mixed calcium salts that formed, slowly crystallized. The crystalline material was filtered and dried in a desiccator over calcium chloride. The yield was 24.8 grams. Five grams of this product was condensed with o-phenylene diamine by the method of Moore and Link (J. Biol. Chem. 133, 300 (1944)). The filtered reaction mixture was made ammoniacal and after cooling at 5° for several hours, 0.7 gram of crude arabobenzimidazole was obtained. A second crop of 0.24 gram was isolated from the mother liquor. The yield of calcium D-arabonate was 17 per cent of that required by theory.

The electrolytic oxidation reaction involved in this invention requires, for its best mode of operation, a certain minimum amount of electrical energy, and this amount is determined by the amount of calcium 2-keto-D-gluconate being oxidized. The theoretical requirement is approximately 107 ampere-hours per mole. In Example 1 of the specification, one-eighth mole of calcium 2-keto-D-gluconate was oxidized, and the theoretical amount of electrical energy was therefore 13.4 ampere-hours. In Example 3 of the specification, approximately one-eighth mole of the salt was oxidized, the theoretical electrical energy requirement being again 13.4 ampere-hours. In Example 4, one-sixteenth mole was oxidized, the theoretical requirement being in this case 6.7 ampere-hours.

Having thus described our invention, we claim:

1. The process for preparing calcium D-arabonate which comprises subjecting an aqueous solution of calcium 2-keto-D-gluconate to electrolytic oxidation under slightly acid conditions in the presence of calcium bromide in the proportion of less than one equivalent per equivalent of calcium 2-keto-D-gluconate and at a temperature of 5° to 30° C. the electrolysis being discontinued at the stage at which minimum reduction with Fehling's solution is reached.

2. A process of making calcium D-arabonate from calcium 2-keto-D-gluconate, comprising electrolytically oxidizing an aqueous solution of calcium 2-keto-D-gluconate, the pH of the solution being in the range from about 6 to, but less than, 7, in the presence of calcium bromide in the proportion of less than one equivalent thereof per equivalent of calcium 2-keto-D-gluconate at a temperature between about 5° to 30° C., the electrolysis being continued up to and discontinued at the stage at which minimum reduction with Fehling's solution is reached, treating the oxidized solution with calcium carbonate, separating the solution, and subsequently concentrating to crystallize out calcium D-arabonate pentahydrate.

3. A process comprising electrolytically oxidizing an aqueous solution of calcium 2-keto-D-gluconate, the pH of the solution being in the range from about 6 to, but less than, 7, in the presence of calcium bromide in the proportion of less than one equivalent thereof per equivalent of calcium 2-keto-D-gluconate, at a temperature between about 5° to 30° C., the electrolysis being continued for at least 13.4 ampere hours per one-eighth mole of calcium 2-keto-D-gluconate and being continued no further than the stage at which minimum reduction with Fehling's solution is reached, and recovering calcium D-arabonate from the oxidized solution.

4. A process comprising electrolytically oxidizing a slightly acidic aqueous solution of calcium 2-keto-D-gluconate in the presence of a water-soluble bromide in solution at a temperature in the range of about 5° to 30° C., the electrolysis being continued at least until calcium D-arabonate is formed and for at least about 107 ampere-hours per mole of calcium 2-keto-D-gluconate, but no further than the stage at which minimum reduction with Fehling's solution is reached, and recovering the calcium D-arabonate from the solution.

5. A process of making calcium D-arabonate from calcium 2-keto-D-gluconate comprising electrolytically oxidizing a slightly acidic aqueous solution of calcium 2-keto-D-gluconate in the presence of calcium bromide in solution at a temperature in the range of about 5° to 30° C., the electrolysis being continued no further than the stage at which minimum reduction with Fehling's solution is reached, and for at least about 13.4 ampere-hours per one-eighth mole of calcium 2-keto-D-gluconate.

6. The process of claim 5 operated at a temperature of 5° to 10° C.

7. The process of claim 5 in which the pH of the solution is in the range of about 6 to, but less than, 7 the electrodes being of graphite, and the solution being stirred during the electrolytic oxidation.

CHARLES L. MEHLTRETTER.
WILLIAM DVONCH.

REFERENCES CITED

The following references are of record in the file of this patent:

UNITED STATES PATENTS

| Number | Name | Date |
|---|---|---|
| 1,976,731 | Isbell | Oct. 16, 1934 |
| 2,222,155 | Pasternack et al. | Nov. 19, 1940 |

FOREIGN PATENTS

| Number | Country | Date |
|---|---|---|
| 365,414 | Great Britain | Jan. 21, 1932 |

OTHER REFERENCES

Industrial and Engineering Chemistry, vol 24, 1932, pp. 375–378.

Bureau of Standards Journal of Research, vol. 6, pp. 1145–1152.

Journal American Chemical Society, vol 57, 1935, p. 773.

Transactions Electrochemical Society, vol. 74, 1938, pp. 625–649.